UNITED STATES PATENT OFFICE.

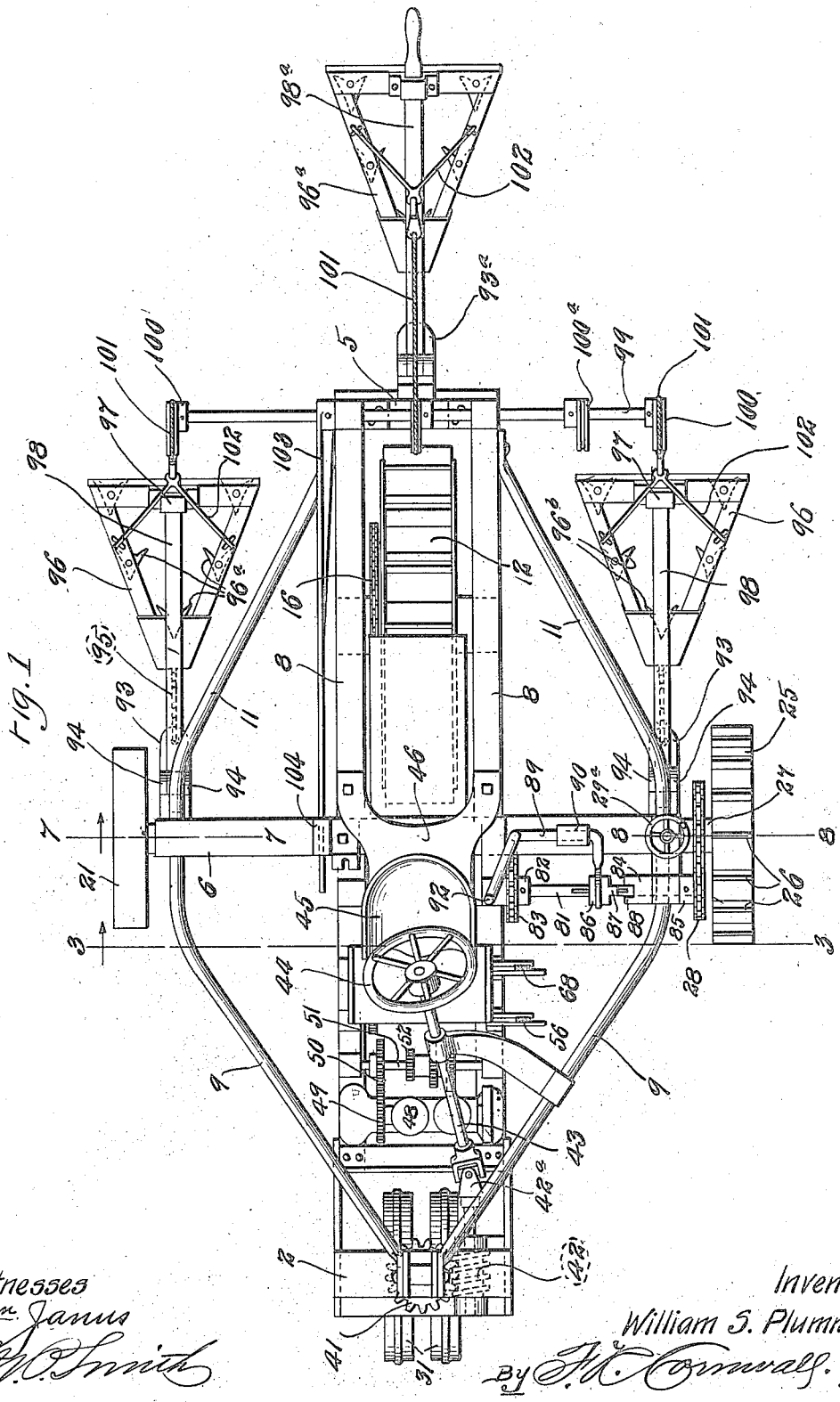

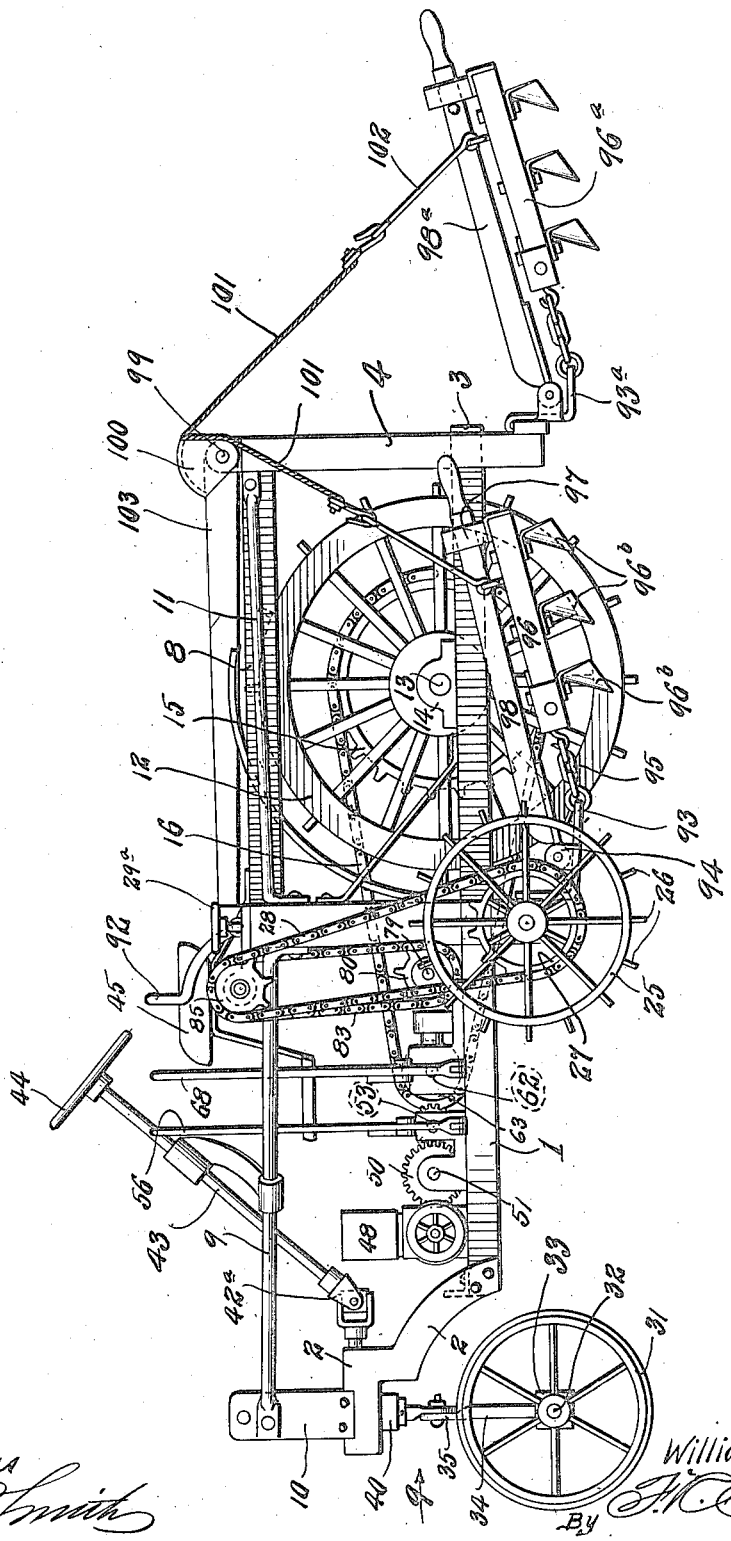

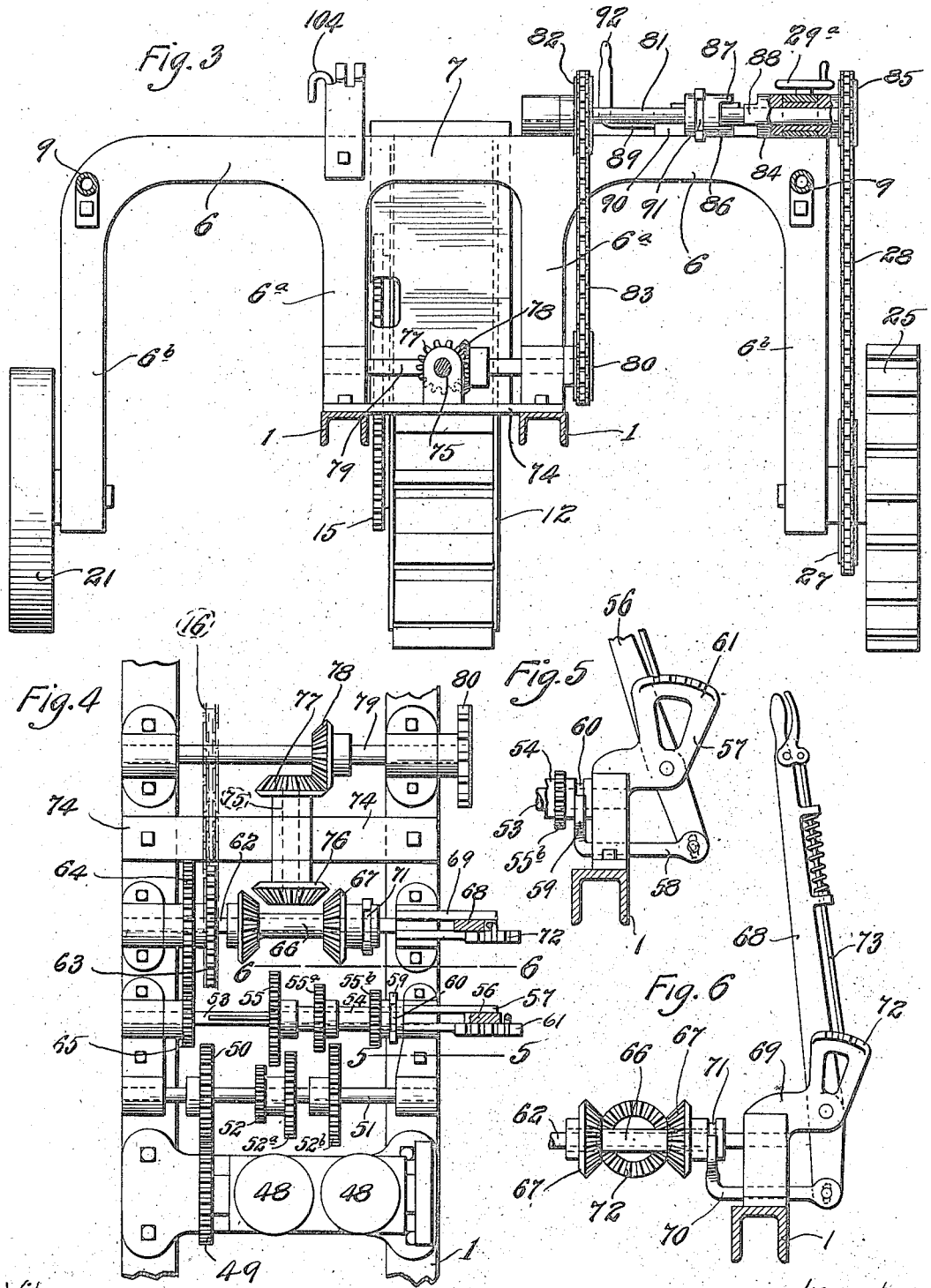

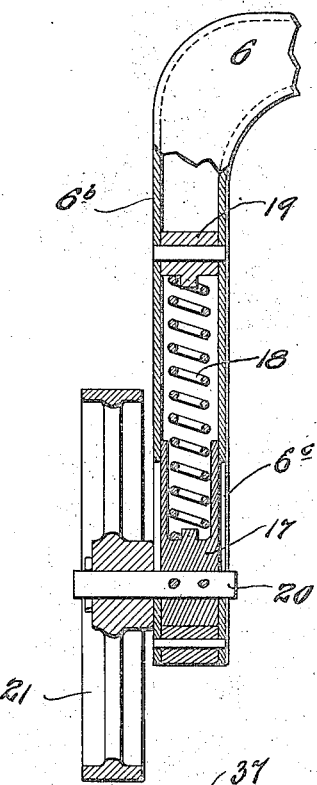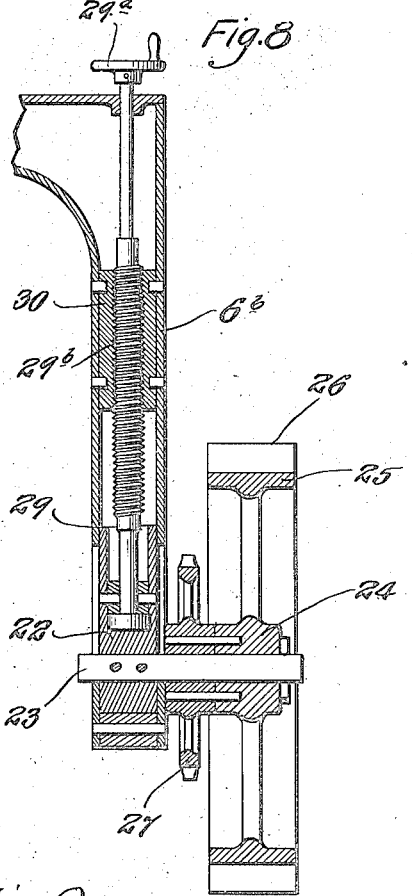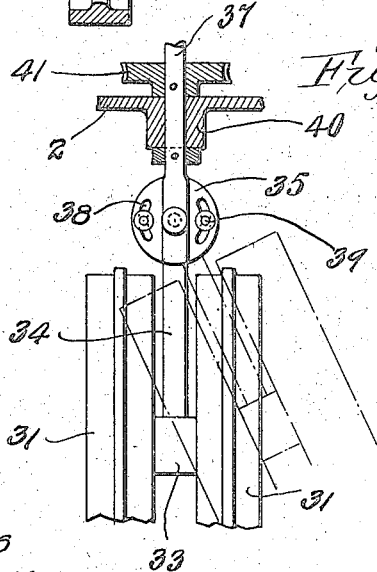

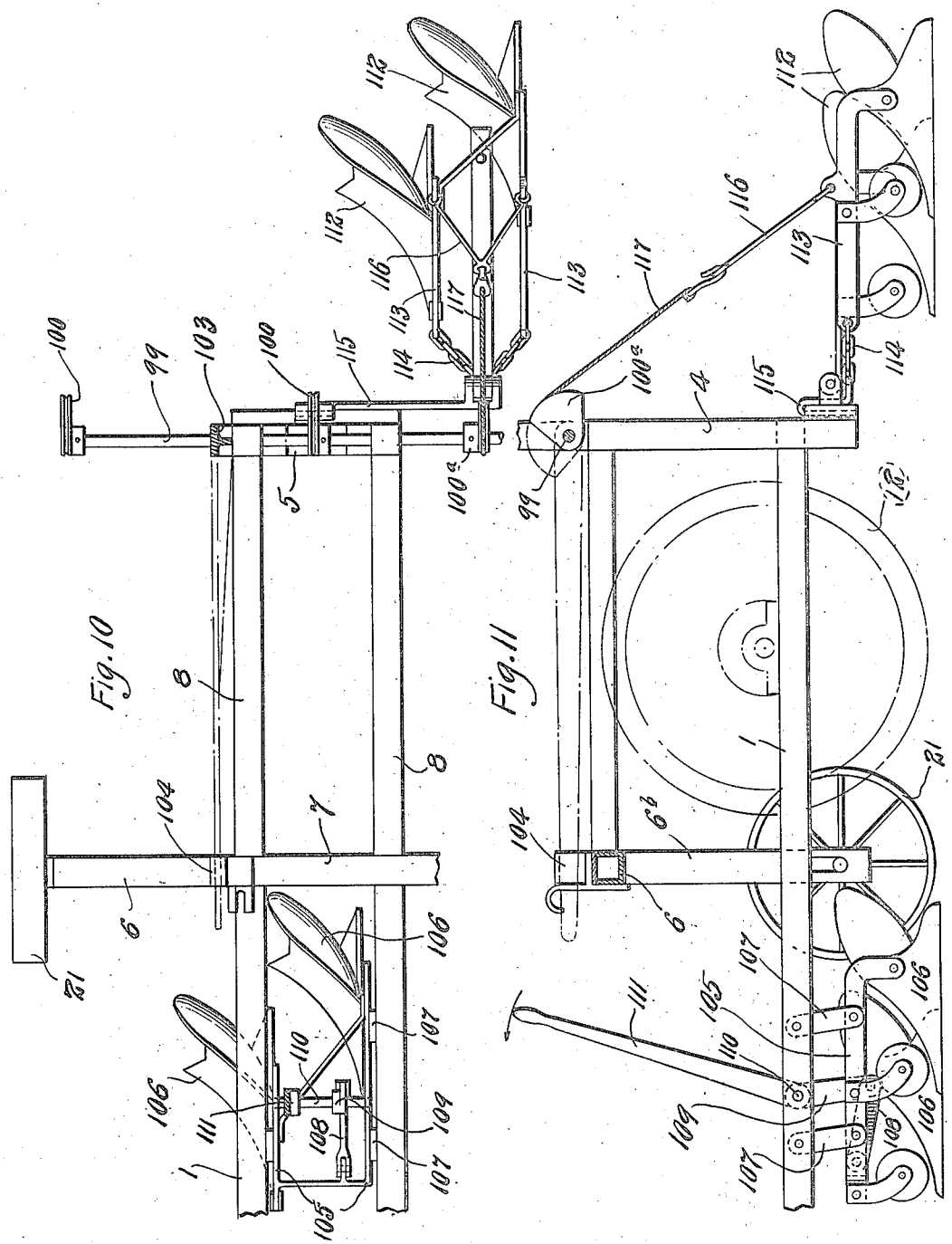

WILLIAM S. PLUMMER, OF ST. LOUIS, MISSOURI.

MOTOR PLOW AND CULTIVATOR.

1,167,429.

Specification of Letters Patent. Patented Jan. 11, 1916.

Application filed April 11, 1914. Serial No. 831,318.

*To all whom it may concern:*

Be it known that I, WILLIAM S. PLUMMER, a citizen of the United States, residing at the city of St. Louis, State of Missouri, have invented a certain new and useful Improvement in Motor Plows and Cultivators, of which the following is a full, clear, and exact description, such as will enable others skilled in the art to which it appertains to make and use the same, reference being had to the accompanying drawings, forming part of this specification, in which—

Figure 1 is a plan view of a combined motor plow and cultivator of my improved construction. Fig. 2 is a side elevational view of the machine. Fig. 3 is a transverse section taken approximately on the line 3—3 of Fig. 1. Fig. 4 is an enlarged plan view of a portion of the front portion of the frame of the machine and showing the motor and the gearing associated therewith, which gearing is utilized in driving the machine forward or backward and for turning in either direction. Fig. 5 is a detail section taken approximately on the line 5—5 of Fig. 4. Fig. 6 is a detail section taken approximately on the line 6—6 of Fig. 4. Fig. 7 is an enlarged detail section taken approximately on the line 7—7 of Fig. 1. Fig. 8 is an enlarged detail section taken approximately on the line 8—8 of Fig. 1. Fig. 9 is an enlarged elevational view taken looking in the direction indicated by the arrow 9, Fig. 2. Fig. 10 is a plan view of a portion of the main frame of the machine, and showing the plows and their connections with said frame. Fig. 11 is a side elevational view of the main frame and the plows.

My invention relates to an agricultural implement, known as a combined plow and cultivator and operated by a suitable motor, preferably, an internal combustion engine, the principal object of my invention being to generally improve upon the existing types of similar agricultural implements, and to produce a comparatively simple and easily operated machine, which can be economically and efficiently used for plowing and cultivating purposes.

A further object of my invention is to provide a combined traction plow and cultivator which, as a whole, is largely automatic in character and the operating parts of which are all under ready control of a single operator.

Further objects of my invention are: to provide a combined traction plow and cultivator which is particularly adapted for turning sharp corners, or being turned completely around within a comparatively small space; to provide a machine having a comparatively light, strong and rigid frame which is comparatively narrow so that it will readily pass between two adjacent rows of standing corn and to combine with said frame arches which straddle the two rows of corn between which the main frame passes; to combine with said arches a comparatively small pair of traction wheels, one of which is adjustable and the other being yieldingly mounted; to provide a machine having a single large traction wheel which is constructed so as to readily pass over soft and uneven ground; to provide connections for cultivator frames, said connections, while permitting the cultivator frames to move vertically prevent said frames from moving laterally, which latter action would result in injury to the standing corn; to provide simple means for simultaneously elevating all of the cultivator frames, and to provide simple plow carrying frames, and means for elevating said frames to raise the plows out of the ground while the machine is being turned around or driven to and from the point of work.

With the foregoing and other objects in view, my invention consists in certain novel features of construction and arrangement of parts, hereinafter more fully described and claimed.

The frame of my improved machine is constructed from metal bars, such as channels, angle irons, and tubes, and comprises a pair of longitudinally extending parallel rails 1, the forward ends of which are united by a forwardly and upwardly extending arch 2. The rear ends of these rails 1 are connected by a cross bar 3 and rigidly fixed to said rear ends are posts or uprights 4, the upper ends of which are united by a cross piece 5. Fixed to the central portions of rails 1 are the lower ends of the inner legs 6ª of inverted U-shaped arches 6, the outer legs 6ᵇ of which are extended downward to a plane below that occupied by the rails 1, and said outer legs serve as supports for the small traction wheels at the sides of the machine. The arches 6 are preferably made tubular in order to combine lightness of weight with strength, and uniting the upper end of the inner legs 6ª of said arches is a transversely arranged tubular member 7.

The upper ends of uprights 4 are connected to the upper portions of the arches 6 by means of longitudinally disposed rails 8. Braces 9, preferably in the form of tubes, are arranged between the outer upper corners of the arches 6, and a bracket 10, which latter is fixed to and projects upwardly from the arch 2. Brackets 11 are arranged between the upper outer corners of the arches 6 and the rear ends of rails 8. The main traction wheel 12 of my improved machine occupies a position between the rails 1 and to the rear of the arches 6 and the axle or shaft 13 of this wheel is journaled in suitable bearings 14, which are fixed on the rails 1. This main traction wheel may be of any desired construction, but I prefer to use the type of wheel shown in my Patent No. 1,003,500, dated September 19, 1911. Fixed in any suitable manner to the side of this traction wheel is a sprocket wheel 15 upon which operates a sprocket chain 16. Arranged for sliding movement in the lower portion of the outer leg of one of the arches 6 is a block 17, and bearing on the top thereof is a compression spring 18, the upper end of which bears against a block 19 which is fixed within the corresponding leg 6ᵇ.

Rigidly fixed in the sliding block 17 is a short shaft or trunnion 20, upon the outer end of which is journaled a small wheel 21. The inner and outer face of the corresponding leg 6ᵇ are provided with vertical slots 6ᶜ which permit the shaft or trunnion 20 to move vertically with respect to the corresponding leg of the arch.

The spring 18 is sufficiently heavy to normally maintain the block 17 at the lower end of the corresponding leg of the arch, but as the wheel 21 passes over rough ground, said block will be permitted to yield or move vertically against the resistance offered by said spring, thus eliminating considerable vibration and jolting which would otherwise be transmitted to the frame of the machine. Arranged for sliding movement in the outer leg of the opposite arch is a block 22 and rigidly fixed thereto is the inner end of a short shaft or trunnion 23. Loosely mounted on the outer end of this shaft or trunnion is the hub 24 of a small traction wheel 25 and fixed on the rim of this last mentioned wheel is a series of transversely disposed ribs or fins 26. Fixed to the hub 24 is a sprocket wheel 27 upon which operates a sprocket chain 28. The walls of the corresponding leg 6ᵇ are slotted vertically to accommodate the shaft 23, and pivotally connected to the upper end of said block 22 is the lower end of a screw rod 29 which passes upward through the corresponding outer leg and the upper end of this screw rod is provided with a small hand wheel 29ª. A portion of the rod 29 is threaded as designated by 29ᵇ, and this portion operates through a threaded block 30 which latter is rigidly fixed in any suitable manner in the corresponding leg 6ᵇ. By rotating the rod 29 the block 22 carrying the traction wheel 25 and sprocket wheel 27 can be raised or lowered relative to the corresponding outer leg 6ᵇ, thus varying the height at which this side of the machine travels.

It will be understood that while my improved machine is being used for plowing, the wheel 25 travels over the plowed ground, and as freshly plowed ground is higher than the unplowed ground, said wheel 25 is made vertically adjustable in order that the entire frame of the machine can be maintained level so that both sets of plows will pass through the ground at practically the same depth. Under ordinary conditions there is sufficient slack on the chain 28 to permit the wheel 25 to be adjusted vertically a few inches without lengthening or shortening said chain, but, of course, if said wheel is raised to a considerable extent it will be necessary then to remove one or two links of the chain.

The means for steering my improved machine comprises a pair of comparatively small wheels 31 which are arranged side by side, and the hubs of which are journaled upon a short shaft 32, the same being seated in a block 33 which is carried by the lower end of a post or upright 34. The upper end of this post is provided with a plate or disk 35 which is pivotally connected to a corresponding plate or disk 36, and which latter disk is fixed on the lower end of a short vertically disposed shaft 37.

The disks 35 and 36 are transversely disposed with respect to the longitudinal axis of the machine and one of said disks is provided with arcuate slots 38 which receive bolts 39 carried by the opposite plate, thus providing means for adjusting the position of the steering wheels, 31, and which adjustment is necessary in order to overcome any tendency of the machine to shift or bear toward one side while in operation, which movement results from side strains imparted to the machine by the plows traveling in comparatively hard ground.

The shaft 37 which serves as an axis for the steering wheels is journaled in a suitable bearing 40 on the arch 2 and fixed on the upper portion of said shaft is a worm wheel 41. Coöperating with said worm wheel is a worm 42, the shaft of which is journaled for rotation in suitable bearings on the arch 2, and connected to the rear end of the shaft of this worm by a universal joint 42ª is the lower forward end of a steering rod 43, the upper end of which is provided with a hand wheel 44. This hand wheel is located directly in front of an operator's seat 45, which latter is supported by a suitable bracket 46, the same being fixed to the forward portions of rails 8.

Mounted on the forward portions of the rails 1 is a suitable motor 48, preferably an internal combustion engine, and meshing with a gear wheel 49 which is fixed on the engine shaft is a gear wheel 50, the latter being fixed on a shaft 51 which is journaled for rotation in suitable bearings on the rails 1 to the rear of the engine.

Fixed on the shaft 51 are three differentially sized pinions 52, 52ª and 52ᵇ. Journaled in suitable bearings on the rails 1 to the rear of shaft 51 is a shaft 53 and arranged to slide lengthwise thereupon and to rotate therewith is a sleeve 54 carrying three differentially sized pinions 55, 55ª and 55ᵇ. The corresponding pairs of pinions on the shafts 51 and 53 are adapted to be thrown into mesh with each other as the sleeve 54 is shifted lengthwise upon said shaft 53 in order to impart variable speed to said shaft 53, and thus the machine can be driven forward at three different speeds.

The sleeve 54 is shifted lengthwise upon its shaft by means of a hand lever 56, the same being pivotally mounted upon a bracket 57 and the lower end of said lever being connected to a sliding rod 58, the inner end of which is bifurcated as designated by 59 to engage in a groove 60 in the sleeve 54. Formed on the bracket 57 is a segmental rack 61 which is adapted to receive a latching member carried by the hand lever 56 and thus providing means for locking the sleeve 54 in its shifted position. Mounted for rotation in suitable bearings to the rear of shaft 53 is a shaft 62 on which is fixed a sprocket wheel 63 around which passes the sprocket chain 16. Fixed on this shaft 62 is a gear wheel 64 which meshes with a pinion 65 on the shaft 53. Arranged to rotate with and slide upon shaft 62 is a sleeve 66, the ends of which carry beveled pinions 67. Sleeve 66 is shifted lengthwise upon its shaft by means of a hand lever 68, the same being pivotally mounted upon a bracket 69 and connected at its lower end to a sliding rod 70, the lower end of which is bifurcated and engages in a groove 71 in the outer end of sleeve 66. Brackets 69 is provided with a segmental rack 72 which is adapted to receive the lower end of a locking member 73 carried by said lever 68, thus providing means for locking the sleeve 66 in shifted position.

Journaled in a suitable bearing on a cross bar 74 which connects the rails 1 is a shaft 75 and fixed on one end thereof between the beveled pinions 67 is a beveled pinion 76. Fixed on the opposite end of this shaft is a beveled pinion 77 which meshes with a corresponding pinion 78, the latter being fixed on a shaft 79 which is journaled for rotation in suitable bearings on the rails 1. Fixed on the left hand end of this shaft 79 is a sprocket wheel 80. Journaled for rotation in suitable bearings which project forwardly from the upper portion of the left hand arch 6 is a shaft 81 and fixed thereon is a sprocket wheel 82 and connecting this sprocket wheel with sprocket wheel 80 is a sprocket chain 83.

Loosely mounted on the outer portion of shaft 81 is a sleeve 84, the same being loosely mounted in the outer one of the bearings of said shaft 81, and fixed on the outer end of this sleeve is a sprocket wheel 85. This sprocket wheel is connected to sprocket wheel 27 by the sprocket chain 28. Arranged to rotate with and slide upon shaft 81 is a collar 86 provided on one end with a clutch face 87 which is adapted to engage a corresponding clutch face 88 that is formed on the inner end of sleeve 84. The collar 86 is moved lengthwise upon shaft 81 by means of a sliding rod 89, the same being mounted for movement in a suitable bearing 90 which is mounted on top of the corresponding arch 6 and the outer end of this rod is bifurcated and engages in a groove 91 in said collar 86. The inner end of this sliding rod is bent forward as designated by 92 and terminates adjacent the left hand side of the operator's seat 45.

Fixed to the lower ends of the outer legs 6ᵇ of the arches and projecting rearwardly therefrom are brackets 93 and formed integral with each of these brackets is a pair of vertically disposed ears 94. Connected to each bracket by means of a flexible connection 95, preferably a chain, is the forward end of a cultivator frame 96, the same being preferably triangular in plan view and each frame carries a series of depending cultivator shovels 96ᵇ. Arranged on the top of the rear portion of each cultivator frame is a loop 97 and arranged to slide therethrough is the rear portion of a tongue or handle bar 98, the forward end of which is hinged between the corresponding pair of ears 94. By arranging these ears 94 vertically and passing the hinge pin transversely therethrough and through the forward end of the corresponding handle bar, the latter is held to move vertically and is prevented from moving laterally for, if such lateral movement were permitted, the cultivator frames would strike against and injure the standing corn. A third cultivator frame 96ª provided with depending cultivator shovels and in every way similar to the frames 96 is arranged on a third tongue or handle bar 98ª, which latter is hinged to a bracket 93ª which projects rearwardly from the cross bar between the lower ends of the posts or uprights 4. The forward end of this third cultivator frame is connected to bracket 93ª by a flexible connection such as a chain.

Mounted for rotation in suitable bearings on top of the posts or uprights 4 is a transversely disposed shaft 99 on which is fixed a series of segmental eccentrics 100, the same having their outer edges grooved, and fixed to these eccentrics are the upper ends of cables or chains 101, the lower ends of which are detachably connected to bails 102, the same being attached to the cultivator frames 96 and 96ª. The eccentrics 100 are arranged on the shaft 99 so that when the latter is partially rotated forwardly the eccentrics will take up the cables or chains 101 in such a manner as to simultaneously elevate all of the cultivator frames. Fixed to the shaft 99 is the rear end of a handle 103 which is of sufficient length to extend over the top of the corresponding one of the arches 6 when said handle is moved into a horizontal plane and to maintain the handle in its lowered position or in a horizontal plane a hook 104 arranged on the top of the corresponding arch, which hook receives the forward end of said handle as the same is moved downward to raise the cultivator frames.

The plows associated with my improved machine are arranged in pairs on frames, which are readily detachable from the main frame of the machine, and the front frame 105 comprises a pair of parallel side members and a front cross member. Fixed in any suitable manner to the side members of this frame are plows 106, and if desired, disk colters may be arranged on the frame 105 in advance of these plows. This frame is suspended by means of pivoted links 107 which depend from the forward portions of the rails 1, and thus one of the plows occupies a position directly in front of the main traction wheel 96 so that said wheel traverses the furrow made by this plow. The other plow of this pair occupies a position immediately in front of and to one side of the plow which forms the furrow traversed by the main traction wheel, and thus during the plowing operation, a pair of adjacent furrows are formed, and the soil turned over by the rear plow enters the furrow made by the forward plow of this particular pair.

Pivotally connected to the frame 105 is one end of a link 108 and pivotally connected to the opposite end of this link is the lower end of a link 109. The upper end of this link 109 is fixed to a shaft 110, the ends of which are journaled in the rails 1 and fixed to this shaft is the lower end of a hand lever 111, the upper end of which terminates adjacent to the operator's seat 45. By moving the upper end of this handle 111 forward shaft 110 is rocked, thereby actuating links 109 and 108 and as a result frame 105 is swung rearwardly and at the same time upwardly, owing to its connections with the rails 1. The rear pair of plows 112 are carried by a frame 113, the forward end of which is connected by a chain or cable 114 to a bracket 115 which projects laterally from the rear end of the main frame of the machine. This frame 113 is provided with a bail 116 to which is fixed the lower end of a chain or cable 117, the upper end of which passes over and is connected to an eccentric 100ª which is carried by shaft 99. Thus, when shaft 99 is partially rocked forwardly the rear plow carrying frame will be elevated to raise the rear plows from the ground. The rear pair of plows 112 are positioned so that the soil turned up with the forward one of the pair is thrown into the furrow made by the rear one of the forward pair of plows, and the soil turned up by the rear one of the rear pair is thrown into the furrow made by the forward plow of the rear pair.

It will be understood that during plowing operations all of the cultivator frames are removed from the machine and likewise when cultivating with the machine the plow carrying frames are detached.

During the operation of my improved agricultural implement, the motion and power of the engine shaft is transmitted to shaft 51 through pinions 49 and 50 and from thence to shaft 53 through the differential gearing located on shafts 51 and 53, and from thence through shaft 62 to gear wheels 64 and 65. As shaft 62 is rotated corresponding motion will be imparted to the main traction wheel by means of sprocket chain 16 on the sprocket wheels 63 and 15. The speed of the machine is controlled by manipulating the handle 56 to shift the sleeve 54 on the shaft 53, thereby bringing into engagement any desired pair of the pinions which form the differential speed transmission.

Where the machine is used for plowing, the operator operates the hand lever 111 to permit the forward pair of plows to lower into the ground, and by releasing the handle 103 permits the rear pair of plows to descend, and thus as the machine moves forward, four parallel furrows are formed with the main traction wheel 12 traveling in the furrow formed by the rear one of the forward pair of plows. During the forward movement of the machine the same is steered by proper manipulation of the hand wheel 44, the motion of which is transmitted through worm 41 to shaft 37, and which last mentioned shaft is connected to the post or upright 34 on which the steering wheels 31 are journaled.

As hereinbefore described, the steering wheels 31 can be swung to either side into an angular position with respect to a vertical line as shown by dotted lines in Fig. 9, thus overcoming any tendency of the machine to gradually shift sidewise during the operation and which shifting movement results from side strains imparted to the machine by the action of the plows when in the ground. It is also necessary to adjust the angularity of the steering wheels where the machine is being operated on inclined ground, as for instance, on the side of a hill.

During the cultivating of standing corn or the like, the machine is driven forward between two adjacent rows of the corn and during such forward movement the arches 6 pass over the adjacent rows without injury thereto, and the soil around the roots of these adjacent rows is turned up in the usual manner by the cultivator shovels, which depend from the cultivator frames 96 and 96ª. Likewise a portion of the soil which is adjacent the two rows outside the machine is turned up, and thus as the machine moves forward, practically three rows of corn are cultivated.

During the cultivating operation the plow carrying frames are free to move vertically, but owing to the manner of pivoting the forward ends of the poles of handle bars 98 and 98ª, said cultivator frames are prevented from moving laterally, which action would result in injury to the standing corn. In case any one set of plows should encounter an obstruction such as a stone or root, an operator can readily elevate this particular cultivator frame by manually engaging the rear end of the corresponding pole or handle bar.

When it is desired to turn the machine around, as at the end or side of a field, the operator manually engages the handle 68 and actuates the same to shift the sleeve 66 in one direction or the other, depending on the direction in which it is desired to turn, and as a result, one or the other of the beveled pinions 67 is brought into engagement with the corresponding beveled pinion 76, and thus the motion of shaft 62 will be imparted to shaft 75, and through beveled pinions 77 and 78 this motion will be transmitted to shaft 79 on which sprocket wheel 80 is fixed. The motion of shaft 79 is transmitted to shaft 81 by means of sprocket chain 83 operating on the sprocket wheels 80 and 82, and to transmit this motion to the small traction wheel 25, the operator manipulates sliding rod 89 to throw the clutch face of collar 86 into engagement with clutch face on the inner end of sleeve 84.

When the parts just mentioned have been shifted so that the small traction wheel 25 is driven backwardly or reversely with respect to the motion of the main traction wheel 12, the fins or ribs 26 on the small traction wheel will engage in the ground and exert an effect to cause the machine to turn sharply or within a limited space toward the left hand, it being understood, of course, that the operator shifts the front steering wheels so that the same are directed toward the left. Likewise the parts just described can be adjusted so that the small traction wheel is positively driven forwardly with the main traction wheel, and with the steering wheels turned toward the right hand, the machine will be turned around toward the right within a comparatively small space.

A machine of my improved construction is comparatively simple, is readily controlled by a single operator, and provides efficient means whereby a comparatively large amount of plowing or cultivating can be accomplished within a comparatively short space of time.

It will be readily understood that minor changes in the size, form and construction of the various parts of my improved combined plow and cultivator can be made and substituted for those herein shown and described, without departing from the spirit of my invention, the scope of which is set forth in the appended claims.

I claim:

1. In a combined traction plow and cultivator, an elongated narrow main frame, a main traction wheel mounted in said frame, a steering wheel at the forward end of said frame, inverted U-shaped arches fixed to and extending outwardly from the sides of the main frame, small wheels on the outer legs of said arches, a motor on the main frame, and driving connections from said motor to the main traction wheel.

2. In a combined traction plow and cultivator, an elongated narrow main frame, a main traction wheel, mounted in said frame, a steering wheel at the forward end of said frame, inverted U-shaped arches fixed to and extending outwardly from the sides of the main frame, small wheels on the outer legs of said arches, a motor on the main frame, driving connections from said motor to the main traction wheel, and means on the rear portion of the main frame, and the outer legs of the inverted U-shaped arches for attaching plow carrying frames.

3. In a combined traction plow and cultivator, an elongated narrow main frame, a main traction wheel mounted for operation therein, a motor on said frame, driving connections from the motor to the main traction wheel, a steering wheel at the forward end of the frame, arches fixed to and extending outwardly from the sides of the frame, small wheels on the outer legs of said arches, and driving connections between the motor and one of said small wheels.

4. In a combined traction plow and cultivator, an elongated narrow main frame, a main traction wheel mounted for operation therein, a motor on said frame, driving connections from the motor to the main traction wheel, a steering wheel at the forward end of the frame, arches fixed to and extending outwardly from the sides of the frame, small wheels mounted on the outer legs of the arches, one of which small wheels is arranged to yield vertically upon the leg by which it is supported, and yielding pressure means for resisting the upward movement of said wheel.

5. In a combined motor plow and cultivator, an elongated main frame, a large traction wheel mounted for operation in the rear portion of said main frame, an adjustable steering wheel mounted for operation at the forward end of said main frame, inverted U-shaped arches projecting laterally from the sides of the main frame, small wheels mounted on the outer legs of said arches, a motor on the forward portion of the main frame, and driving connections from said motor to the main traction wheel.

6. In a combined motor plow and cultivator, an elongated main frame, a large traction wheel mounted for operation in the rear portion of said main frame, an adjustable steering wheel mounted for operation at the forward end of said main frame, inverted U-shaped arches projecting laterally from the sides of the main frame, small wheels mounted on the outer legs of said arches, one of which small wheels is provided on its tread portion with projections, a motor on the forward portions of the main frame, driving connections from said motor to the main traction wheel, and driving connections from the motor to the small wheel which is provided with the tread projections.

7. In a combined motor plow and cultivator, an elongated main frame, a large traction wheel mounted for operation in the rear portion of said main frame, an adjustable steering wheel mounted for operation at the forward end of said main frame, inverted U-shaped arches projecting laterally from the sides of the main frame, small wheels mounted on the outer legs of the arches, a motor on the forward portions of the main frame, driving connections from said motor to the main traction wheel, driving connections from the motor to one of the small wheels, and means for throwing said driving connections into or out of operation.

In testimony whereof I hereunto affix my signature in the presence of two witnesses, this 2nd day of April, 1914.

WILLIAM S. PLUMMER.

Witnesses:
M. P. SMITH,
M. A. HANDEL.